July 28, 1959
R. E. WADE
2,896,391
PICKUP FOR TRAVELING BALER
Filed May 8, 1957
2 Sheets-Sheet 1
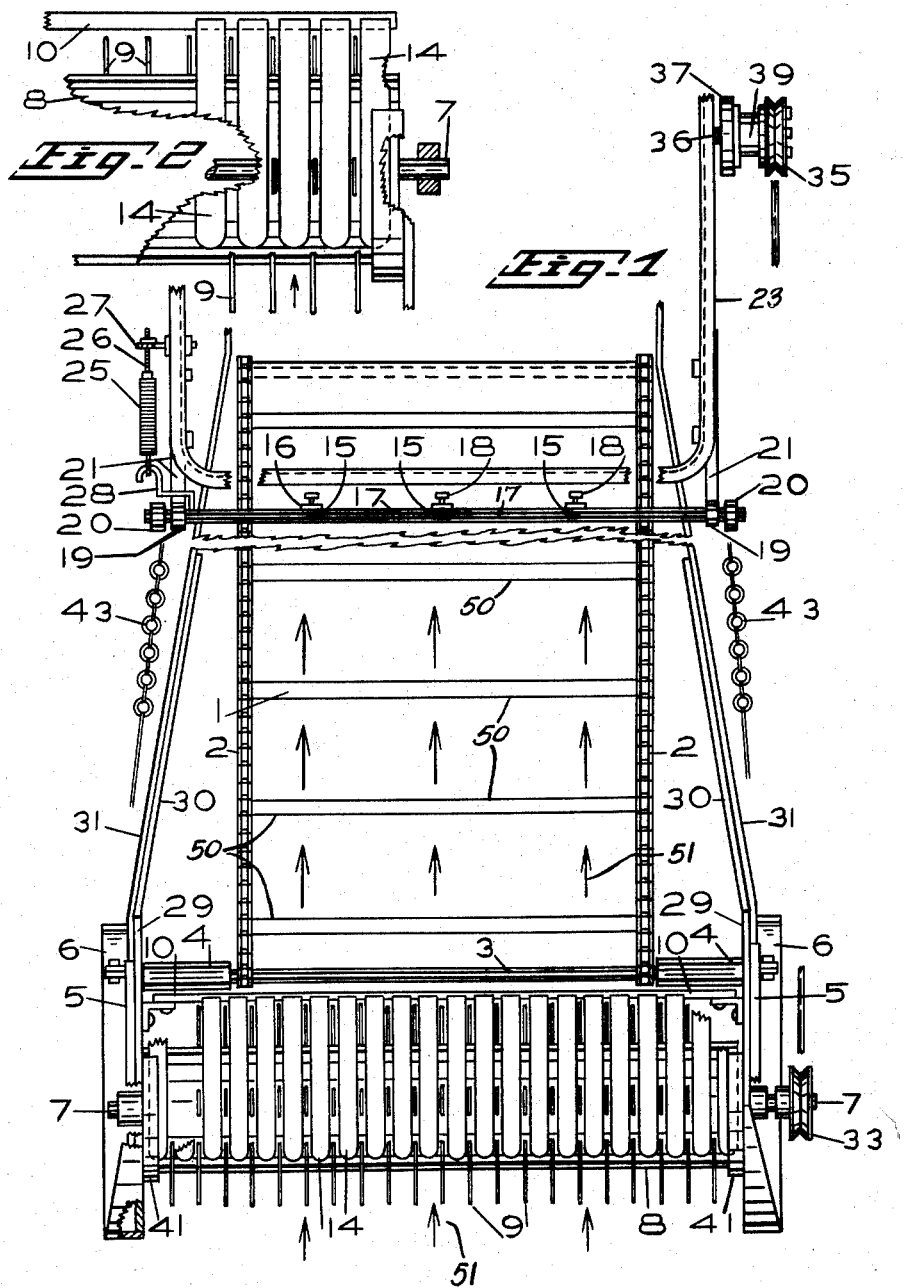
Inventor
Robert Edgar Wade
Per L. J. Mitchell
Attorney

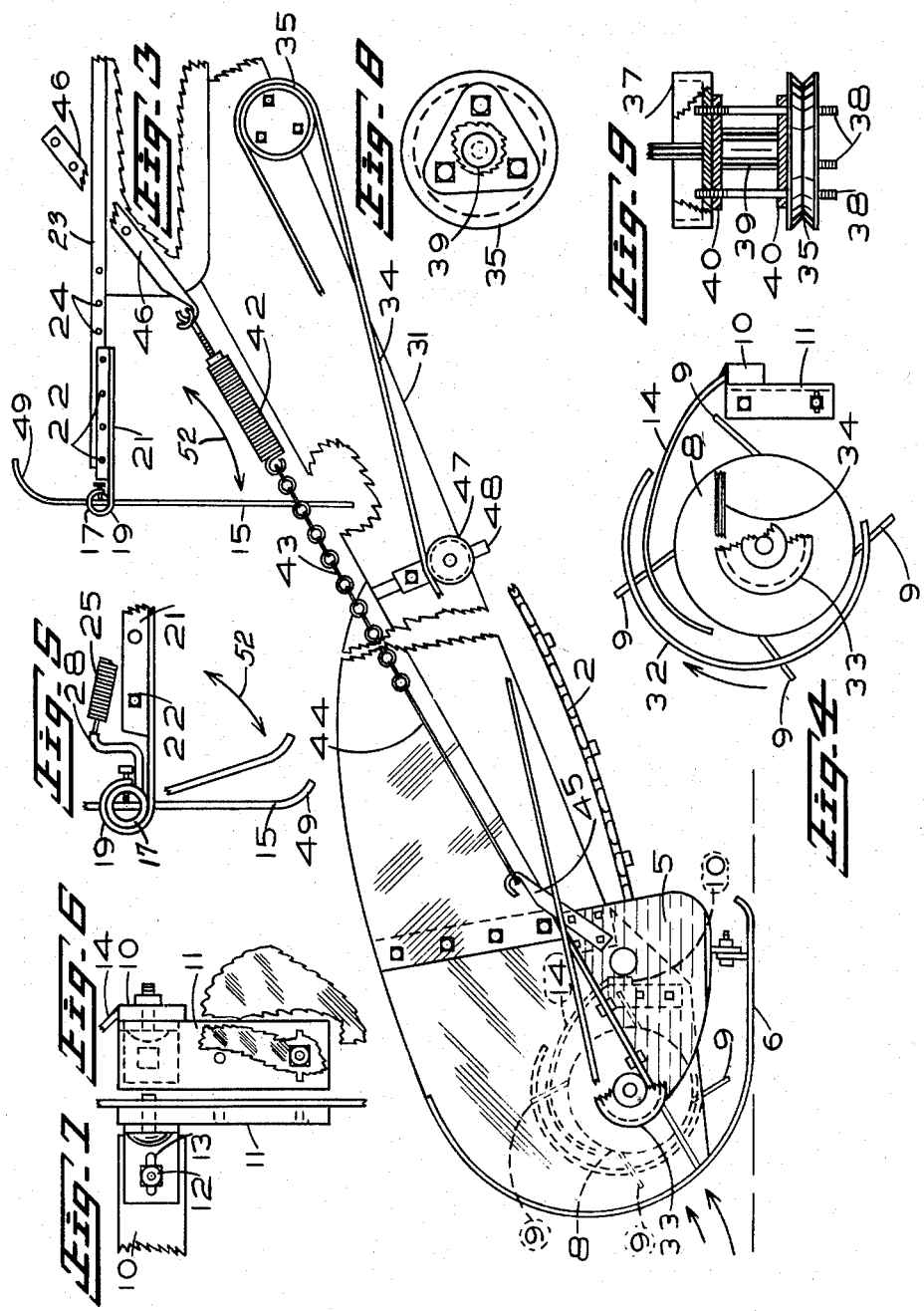

United States Patent Office 2,896,391
Patented July 28, 1959

2,896,391

PICKUP FOR TRAVELING BALER

Robert E. Wade, Consort, Alberta, Canada, assignor of one-half to William Cecil Wade, Consort, Alberta, Canada Application May 8, 1957, Serial No. 657,805

1 Claim. (Cl. 56—364)

This invention relates to spreader and pickup attachments for a travelling baler of a character in which hay, straw and like material is picked up from a swath or windrow on the ground by a conveyer raddle and deposited in a bale forming unit, in which unit the material is rolled and the roll wrapped with twine and discharged.

In such a baler the conveyer raddle is employed to pick the material off the ground without the use of a pickup. But during the period while the bale is being wrapped and discharged the conveyer raddle must stop to eliminate feeding picked up material on top of the bale, and it remains stopped until the wrapping and discharge of the bale has been completed. During this operation the forward motion of the baler must also stop, as with the conveyer raddle stopped there is no way of picking up swathed or windrowed material and the machine would run over the swath.

In what are known as square balers and in combines and other harvesting machines a conveyer with a conventional type of pickup is used mounted in advance of the baler. In this the pickup more usually consists of a drum with teeth, and stripper fingers over which the material is carried from the drum to the conveyer. But for the purpose of the type of baler for which the present invention is designed the conveyer raddle would still have to be stopped to prevent feeding picked up material into the bale forming chamber during the period of twine wrapping and discharging of the bale.

It has also been found in this particular type of baler that the progress of the baler would have to cease during the wrapping of the bale and discharge of the wrapped bale, otherwise the picked up material would pile up on the stripper fingers, and material would wrap on the drum and plug up to an extent that would prevent its turning.

The present invention is designed to overcome these difficulties in a baler of a character designed for forming roll type bales by the use of a conventional pickup employing a drum and stripper fingers. This is done by effecting improvements in the fingers and in the mounting of the drum to prevent piling up of the material on the stripper fingers and drum, and it permits continuous travel of the baler.

To the above has been added a spreader for effecting an even distribution of the material to the bale forming unit. When the conveyer raddle is stopped while the bale is wrapped and discharged the material accumulates on the conveyer raddle and the spreader is designed to spread the material and feed it evenly into the bale forming chamber when the conveyer raddle starts up again.

The present device also includes an improved pulley wheel mounting for the drive connection on the baler.

In the drawings, which illustrate a preferred embodiment of the invention,

Fig. 1 is a top plan view of a conveyer raddle and associated parts for a baler of a type for which my improvements are designed, including the spreader and pickup, shown broken away in part.

Fig. 2 is a detail plan view of a fragment of the drum and stripper fingers, shrown broken away in part and partly in section.

Fig. 3 shows a side view of a conveyer raddle with my spreader and pickup, shown broken away in part.

Fig. 4 shows a detailed end view of the drum and stripper bar and fingers, and including the pulley and belt connection shown broken away, and further including a drum end guard.

Fig. 5 is a detail enlarged fragmentary side view of a mounting for the spreader arms, including a spreader arm and spring, and indicating the movement of the arm when it is pushed back by an accumulation of material, parts being shown broken away.

Fig. 6 shows an enlarged end view of a fragment of the adjustable stripper bar and including the side plate, the latter being shown broken away.

Fig. 7 shows an enlarged front view of a fragment of the adjustable stripper bar and attaching angle plate, and including a fragment of a conveyor drum side plate.

Fig. 8 shows an enlarged end view of the baler pulley wheel shown in Figure 9.

Fig. 9 is a detail enlarged plan view of a takeoff pulley and spacer unit in attachment to a pulley wheel on the baler driven shaft, shown broken away in part and in part sectioned.

In the drawings is shown a conveyer raddle for moving material to a bale forming unit in a baler, this conveyer raddle including an apron 1 with slats 50 at intervals and chain drives 2 and forward shaft 3 with spacer elements 4, the shaft being mounted rotatable in end plates 5 on runners 6.

Mounted rotatable in the end plates 5 is a drum shaft 7 mounting a drum 8 with rows of teeth 9 that incline rearwardly relative to the travel of the drum. Behind this drum is a stripper bar 10 mounted endwise adjustable in angle brackets 11 attached thereto by bolts 12, for which bolts are provided slots 13 to permit endwise adjustment of the bar 10. The direction of travel of the conveyer raddle and drum have been indicated by the arrows 51.

On the bar 10 is a series of stripper fingers 14 alternating with teeth 9 on the drum 8, four rows of teeth being provided circumferentially aligned and leaving spaces for the stripper fingers. The angle brackets 11 attach to the end plates 5 and this is an adjustable attachment, similarly to the attachment of the bar 10, by which the front ends of the stripper fingers may be moved closer or farther away from the drum 8, this being necessary, as, for example, when operating under damp conditions the ends of the fingers must be kept close as possible to the drum to prevent wrapping.

Ordinarily in the drum type of pickup the stripper fingers follow the curve of the drum and extend forward only to the uppermost part of the drum, but in the present pickup a series of flat stripper fingers are provided that are arched, as more clearly apparent in Figs. 3 and 4, and, starting considerably in advance of the uppermost part of the drum 8, extend rearwardly spaced from and above the drum in arched relation thereto, inclining downward from a point approximately above the highest part of the drum, but maintaining the spaced relation to the upper part of the drum and following a contour considerably in excess of the outer side of the drum.

At the lower ends these flat stripper fingers are fixed, as by welding, to the stripper bar. This bar is placed as close as possible to the spacer elements 4 of the conveyer shaft 3, but without hampering the operation of the conveyer raddle slats, the purpose being to minimize the catching of material between the stripper bar and conveyer raddle, In this arrangement the material carried by the drum initially follows the curve of the flat stripper fingers, but at the uppermost part of these fingers the material is projected rearward centrifugally and descends well back on the conveyer raddle. In this the teeth 9 of the drum move in the intervals between the stripper fingers and continue to do so until only just in advance of and as close as possible to the stripper bar, serving to minimize the possibility of material accumulating between the stripper fingers and particularly at the attachment of these to the stripper bar, and avoiding wrapping on the drum.

The stripper unit also serves a necessary compensating purpose when the conveyer raddle is stopped and a heavy accumulation of material is encountered, which piles up material on the conveyer until the stripper bar is reached, when the throwing action of the drum is no longer possible and thrown material striking the face of the pile falls on the stripper fingers. The teeth of the pickup drum impart a pushing action on this, shoving it into the pile and pushing back on the pile itself, accomplishing this without plugging or pulling material down through the stripper fingers.

By slanting the drum teeth and mounting the drum in close relation to the stripper bar so that the teeth move between the stripper fingers the full possible distance the tops of the fingers are swept clean without pulling material down through the fingers. Such a pulling down, were it not for this improvement, would start the material wrapping on the drum and cause a plug up.

Rearwardly on the conveyer I provide spreader means for the material picked up and accumulated on the conveyer raddle during the period when the conveyer raddle has been stopped to permit of tying and discharging a bale. This consists of rods 15 mounted vertically slidable in suitable openings in a transverse rod 17, the tubular rod 17 having fixed thereto blocks 16 in which are threaded set screws 18 by which the rods 15 may be set at any preferred height in relation to the conveyer raddle and spaced therefrom, the rod 17 having suitable openings for penetration of the set screws. These rods, as shown in Figure 3, are reversible end for end and are movable as indicated by the arrows 52 in Figures 3 and 5.

The transverse rod 17 is carried free to turn in looped ends 19 of arms 21 held against endwise movement therein by collars 20. The arms 21 attach by bolts 22 to a U shaped bar 23 on the baler, and are endwise adjustable by provision of extra bolt holes 24. There is further included a spring 25 with an end bolt 26 threaded in a suitable end piece secured in the spring and engaging an eye bolt 27 attached to the U bar 23, permitting endwise adjustment of the spring tension by turning the end bolt 26. This spring engages a hook member 28 fixed to the rod 17 and intermediately bent to rest against the arm 21 and thereby oppose movement of the rod 15 in one direction, the spring opposing movement in the other direction when the rods are pushed back by material on the conveyer raddle.

There is further provided a pair of high side plates 29 of heavy material attached on the inside of the end plates 5, and further side plates 30 of light material carried by the plates 29, these side plates being essential in holding piled up material when the conveyer raddle is stopped.

For driving the drum 8 I provide a V belt pulley 33 on the drum shaft 7 over which pulley is trained a belt 34 crossed over an intermediate pulley 47 mounted adjustable up and down for belt tension on a plate 48 attached to a side plate 31. The belt 34 is carried over a further pulley 35 on an upper continuous running shaft 36, which shaft is a part of the baler structure and driven from the baler.

The pulley 35 requires to be offset relative to a pulley wheel 37 on the shaft 36 by which the shaft 36 is driven, this offset being to align the pulley wheel 35 with the pulley 33. For this the regular bolts of the pulley wheel 37 are replaced by longer bolts 38 threaded at the outer ends and mounting the pulley 35. Between the pulleys 35 and 37 is a sleeve 39 serving as a spacer and also providing access to a nut therein that holds the assembly to the machine together. The spacer 39 is mounted between plates 40 that are open at the ends complementary to the opening through the sleeve.

There are also included protecting guards 41 for the ends of the drum 8.

The conveyer raddle and associated parts is provided with a cushion support, made up of a spring 42 engaged by a length of chain 43 and rod 44 with hooked bar 45 fixed to a side plate 5, and at the other end engaged by a hooked bar 46 that would attach to a frame member in the baler; it being understood that such a spring support would be provided on both sides of the machine.

In the use of the device the baler is designed to pick hay or like material off the ground, preferably from swaths or windrows, and this material caught up by the teeth 9 of the drum 8, the drum being continuously driven. The material moves over the stripper fingers, impelled by the drum teeth, but instead of following the fingers down to the conveyer raddle it leaves them after passing the uppermost part of the drum where the fingers start to incline downward. Impelled by centrifugal force the material is thrown on to the conveyer raddle, landing a considerable way up the conveyer raddle, from where it is carried by the raddle to the bale forming unit in the baler.

When the conveyer raddle is stopped, which would be by a clutch mechanism forming part of the baler construction, the material being picked up accumulates ahead of the spreader rods 15. The bent ends 49 of the rods 15 are preferably used in feeding the material to the baler unit, but it might be noted that in view of the angle the rods extend in relation to the inclined conveyer the straight ends of the rods could also be used. This stoppage lasts about nine seconds, during which time the bale is wrapped and discharged, and at the conclusion of which the conveyer raddle starts running again.

At this stage there is an accumulation of material on the conveyor raddle extending from the spreader rods back to the drum 8 and piled up. When the conveyer raddle starts moving again this material is carried against the spreader rods, which hold the piled up material back while the conveyer raddle feeds the material out from the bottom of the pile at a controlled depth of material. The top of the pile of material keeps dropping on to incoming material which is being fed from the drum pickup on to the conveyer raddle.

With the improvements added to the baler as herein shown it is possible to successfully pickup material such as green feed, straw and hay under adverse conditions, such as stony fields, and to do this without stopping the travel of the machine while wrapping and discharging the bales.

The pickup drum continues to rotate while the conveyer raddle is stopped and material is picked up and accumulated during the wrapping and discharge of the bale. Such material is retarded by the spreader rods, and subsequently when the conveyer raddle starts up again this material is spread to be fed evenly into the bale forming unit, which is essential to the proper formation of the bale.

The spreader rods are vertically adjustable to vary the depth of material fed to the bale forming unit and are also reversible for handling heavy hay or grain, the curved ends of the rods having a hooking action on the piled up material.

The arms 21 are adjustable endwise and the tension of the spring 25 may also be changed to vary the strength of the opposition of the spreader rods when picked up material on the conveyer raddle is fed to the bale forming chamber.

Having thus particularly described and ascertained the nature of my said invention, what I claim and wish to secure by Letters Patent is:

A travelling baler of a character providing a rotatable toothed drum for picking up loose material off the ground, said drum being mounted on a drum shaft, and a conveyer raddle having its forward end terminating on an approximate level with the drum shaft and on which the material is deposited to be elevated and including a series of fingers between the drum and conveyer raddle, in which said fingers are carried on a bar attached at the forward end of the conveyer raddle and said fingers incline forwardly upward from the bar spaced in relation to the drum to form an arch well above the uppermost part of the drum and descending forwardly into close relation to the drum at their forward ends.

References Cited in the file of this patent

UNITED STATES PATENTS

| | | |
|---|---|---|
| 902,391 | Footitt | Oct. 27, 1908 |
| 2,256,699 | Almen | Sept. 23, 1941 |
| 2,378,107 | Russell | June 12, 1945 |
| 2,490,143 | Magee | Dec. 6, 1949 |
| 2,581,542 | Kolzing | Jan. 8, 1952 |